US011070860B2

(12) United States Patent  (10) Patent No.: US 11,070,860 B2
Francisco et al.  (45) Date of Patent: Jul. 20, 2021

(54) CONTENT DELIVERY

(71) Applicants: Mark Francisco, Clarksburg, NJ (US); Bruce Hertzfeld, Narberth, PA (US); Slade Mitchell, Chester Springs, PA (US)

(72) Inventors: Mark Francisco, Clarksburg, NJ (US); Bruce Hertzfeld, Narberth, PA (US); Slade Mitchell, Chester Springs, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/767,513

(22) Filed: Feb. 14, 2013

(65) Prior Publication Data
US 2014/0229968 A1  Aug. 14, 2014

(51) Int. Cl.
*H04N 21/258* (2011.01)
*H04N 21/475* (2011.01)
*H04N 21/63* (2011.01)
*H04N 21/441* (2011.01)

(52) U.S. Cl.
CPC ..... *H04N 21/25875* (2013.01); *H04N 21/441* (2013.01); *H04N 21/4753* (2013.01); *H04N 21/632* (2013.01)

(58) Field of Classification Search
CPC ......... H04N 21/44222; H04N 21/4532; H04N 21/47202; H04N 21/274; H04N 21/44; H04N 21/204
USPC ..................................... 725/9–20, 34, 46–47
See application file for complete search history.

(56) References Cited

U.S. PATENT DOCUMENTS

| 5,828,945 | A | 10/1998 | Klosterman |
| 6,493,878 | B1 | 12/2002 | Kassatly |
| 6,526,577 | B1 | 2/2003 | Knudson et al. |
| 7,221,961 | B1 | 5/2007 | Fukumoto et al. |
| 7,502,619 | B1 | 3/2009 | Katz |
| 7,921,071 | B2 | 4/2011 | Hicks |
| 8,089,946 | B2 | 1/2012 | Brommer |
| 8,139,704 | B2 | 3/2012 | Heinrich |
| 8,149,748 | B2 | 4/2012 | Bata et al. |
| 8,316,088 | B2 | 11/2012 | Jalava et al. |

(Continued)

FOREIGN PATENT DOCUMENTS

GB  1492260 A  11/1977

OTHER PUBLICATIONS

Don Dodge on the Next Big Thing: Indoor Location startups innovating Indoor Positioning, 5 pages, dated Jun. 19, 2013.

(Continued)

*Primary Examiner* — Alexander Q Huerta
(74) *Attorney, Agent, or Firm* — Banner & Witcoff, Ltd.

(57) ABSTRACT

Systems and methods are described that relate to delivering content to users. In one aspect, a primary client device and/or servers may communicate with secondary client devices to determine the identity of one or more users requesting content at the primary client device. Once the users and other attributes are identified, the primary client device may determine user characteristics which may be analyzed in conjunction with one or more spatiotemporal factors related to the content request. This analysis may lead to definition of a scene associated with the content request and to recommendation of content.

21 Claims, 6 Drawing Sheets

(56) References Cited

U.S. PATENT DOCUMENTS

| | | | |
|---|---|---|---|
| 8,385,942 B1 | 2/2013 | Leung et al. | |
| 8,463,295 B1 | 6/2013 | Caralis et al. | |
| 8,522,294 B2 | 8/2013 | Salinger et al. | |
| 8,588,198 B2 | 11/2013 | Salinger | |
| 8,677,502 B2 | 3/2014 | Hanson et al. | |
| 8,705,639 B2 | 4/2014 | Salinger | |
| 8,718,445 B1 | 5/2014 | Berger et al. | |
| 9,084,003 B1 | 7/2015 | Sanio et al. | |
| 2002/0142722 A1* | 10/2002 | Gutta | H04N 21/44222 455/45 |
| 2002/0162121 A1* | 10/2002 | Mitchell | H04N 7/165 725/135 |
| 2003/0188316 A1 | 10/2003 | DePrez | |
| 2004/0068744 A1 | 4/2004 | Claussen et al. | |
| 2004/0117269 A1 | 6/2004 | Karaoguz et al. | |
| 2004/0203374 A1 | 10/2004 | Zilliacus | |
| 2005/0066353 A1 | 3/2005 | Fransdonk | |
| 2005/0097595 A1 | 5/2005 | Lipsanen et al. | |
| 2005/0130585 A1 | 6/2005 | Gnuschke et al. | |
| 2005/0232242 A1 | 10/2005 | Karaoguz et al. | |
| 2005/0240943 A1 | 10/2005 | Smith et al. | |
| 2005/0277428 A1 | 12/2005 | Brown | |
| 2006/0025069 A1 | 2/2006 | Benco et al. | |
| 2006/0046709 A1 | 3/2006 | Krumm et al. | |
| 2006/0080716 A1 | 4/2006 | Nishikawa et al. | |
| 2006/0136496 A1 | 6/2006 | Ohashi | |
| 2007/0089148 A1 | 4/2007 | Oh et al. | |
| 2007/0124789 A1 | 5/2007 | Sachson et al. | |
| 2007/0234213 A1* | 10/2007 | Krikorian | H04N 19/102 715/716 |
| 2007/0299778 A1 | 12/2007 | Haveson et al. | |
| 2008/0077956 A1* | 3/2008 | Morrison | G06Q 30/0613 725/38 |
| 2008/0109307 A1 | 5/2008 | Ullah | |
| 2008/0115166 A1 | 5/2008 | Bhogal et al. | |
| 2008/0134043 A1* | 6/2008 | Georgis | H04N 7/10 715/733 |
| 2009/0017750 A1 | 1/2009 | Marcinkiewicz | |
| 2009/0125971 A1 | 5/2009 | Belz et al. | |
| 2009/0133051 A1* | 5/2009 | Hildreth | H04N 21/4223 725/28 |
| 2009/0144629 A1 | 6/2009 | Ferlitsch et al. | |
| 2009/0165045 A1 | 6/2009 | Stallings et al. | |
| 2009/0216630 A1 | 8/2009 | Carnahan | |
| 2009/0248672 A1* | 10/2009 | Mcintire | G06F 16/41 |
| 2009/0254824 A1* | 10/2009 | Singh | G06Q 30/0267 715/716 |
| 2009/0265737 A1* | 10/2009 | Issa et al. | 725/38 |
| 2009/0265742 A1* | 10/2009 | Schwartz | H04N 7/17318 725/46 |
| 2009/0293018 A1* | 11/2009 | Wilson | G06F 16/951 715/811 |
| 2009/0293095 A1 | 11/2009 | Karaoguz et al. | |
| 2010/0011103 A1 | 1/2010 | Luzzatti et al. | |
| 2010/0107185 A1 | 4/2010 | Shintani | |
| 2010/0115592 A1 | 5/2010 | Belz et al. | |
| 2010/0199295 A1* | 8/2010 | Katpelly | G06F 17/30053 725/14 |
| 2010/0268955 A1 | 10/2010 | Ohno et al. | |
| 2010/0306394 A1 | 12/2010 | Brown et al. | |
| 2010/0325652 A1 | 12/2010 | Lee et al. | |
| 2011/0069940 A1* | 3/2011 | Shimy | H04N 21/44218 386/296 |
| 2011/0113122 A1 | 5/2011 | Drope | |
| 2011/0126251 A1 | 5/2011 | LaFreniere et al. | |
| 2011/0126258 A1 | 5/2011 | Emerson et al. | |
| 2011/0292300 A1 | 12/2011 | Nagara et al. | |
| 2011/0320627 A1* | 12/2011 | Landow | H04N 21/8126 709/231 |
| 2012/0011558 A1 | 1/2012 | Maddali et al. | |
| 2012/0030313 A1* | 2/2012 | McGowan | H04L 67/10 709/219 |
| 2012/0054233 A1* | 3/2012 | Svendsen | G06F 16/639 707/769 |
| 2012/0054856 A1 | 3/2012 | Johansson | |
| 2012/0060176 A1* | 3/2012 | Chai | H04H 60/45 725/10 |
| 2012/0060182 A1 | 3/2012 | Hardin | |
| 2012/0064923 A1 | 3/2012 | Imes et al. | |
| 2012/0117017 A1 | 5/2012 | Phillips et al. | |
| 2012/0117193 A1 | 5/2012 | Phillips et al. | |
| 2012/0117585 A1* | 5/2012 | Curtis | H04N 21/4135 725/25 |
| 2012/0117620 A1 | 5/2012 | Cassidy et al. | |
| 2012/0191776 A1* | 7/2012 | Ruffner | G06Q 30/0201 709/204 |
| 2012/0208466 A1 | 8/2012 | Park et al. | |
| 2012/0240144 A1* | 9/2012 | Rose | H04N 21/252 725/14 |
| 2012/0254347 A1 | 10/2012 | Seetharam et al. | |
| 2012/0259722 A1 | 10/2012 | Mikurak | |
| 2012/0290434 A1* | 11/2012 | Moritz | G06Q 30/0261 705/26.7 |
| 2012/0324550 A1 | 12/2012 | Wasilewski | |
| 2013/0027613 A1 | 1/2013 | Kim et al. | |
| 2013/0036117 A1* | 2/2013 | Fisher | G06F 16/487 707/736 |
| 2013/0047175 A1 | 2/2013 | Ramirez Flores et al. | |
| 2013/0132984 A1* | 5/2013 | Walter et al. | 725/13 |
| 2013/0145385 A1* | 6/2013 | Aghajanyan | H04N 21/251 725/10 |
| 2013/0173765 A1* | 7/2013 | Korbecki | H04N 21/42209 709/221 |
| 2013/0183021 A1* | 7/2013 | Osman | G07F 17/3216 386/239 |
| 2013/0204825 A1* | 8/2013 | Su | G06N 5/04 706/46 |
| 2013/0268357 A1 | 10/2013 | Heath | |
| 2013/0290848 A1 | 10/2013 | Billings et al. | |
| 2013/0331087 A1 | 12/2013 | Shoemaker et al. | |
| 2014/0032635 A1 | 1/2014 | Pimmel et al. | |
| 2014/0040942 A1* | 2/2014 | Ellis | H04N 5/44543 725/30 |
| 2014/0066098 A1 | 3/2014 | Stern et al. | |
| 2014/0067828 A1* | 3/2014 | Archibong | G06F 3/0481 707/748 |
| 2014/0075575 A1* | 3/2014 | Kim | G06Q 30/0251 726/29 |
| 2014/0087752 A1 | 3/2014 | Zhu et al. | |
| 2014/0089958 A1* | 3/2014 | Nichols | H04N 21/251 725/19 |
| 2014/0123165 A1* | 5/2014 | Mukherjee | H04N 21/44222 725/14 |
| 2014/0176310 A1 | 6/2014 | Kotlicki | |
| 2014/0189720 A1* | 7/2014 | Terrazas | H04N 21/44218 725/12 |
| 2014/0223467 A1* | 8/2014 | Hayton | G06Q 30/0631 725/18 |
| 2014/0259047 A1 | 9/2014 | Bakar et al. | |
| 2014/0298386 A1* | 10/2014 | Dasgupta | H04N 21/4532 725/46 |
| 2014/0341109 A1 | 11/2014 | Cartmell et al. | |
| 2015/0026317 A1 | 1/2015 | Ilsar et al. | |
| 2015/0095844 A1 | 4/2015 | Cho et al. | |
| 2015/0181286 A1 | 6/2015 | Gonzalez | |
| 2015/0193433 A1* | 7/2015 | Dykeman | G06F 16/43 707/722 |
| 2015/0249865 A1* | 9/2015 | Oliveira | H04N 21/4755 725/14 |
| 2016/0073143 A1* | 3/2016 | Filev | H04L 67/22 725/10 |

OTHER PUBLICATIONS

Google Search Appliance Security: Notes from the Field, 41 pages, dated Mar. 2013.

Martin Jan Surminen, et al. Location-based DRM using WiFi Access Points, University of Wollongong Research Online, 2007 International Symposium on Communications and Information Technologies, pp. 880-886.

(56) References Cited

OTHER PUBLICATIONS

Daniel Nations. What is AirDrop? How Does It Work? 1 page, retrieved Nov. 26, 2013.
Tile, the world's largest lost and found, 7 pages, retrieved Nov. 26, 2013.
Adena Schutzberg. Ten Things You Need to Know About Indoor Positioning, Directions Magazine, 10 pages, retrieved Nov. 13, 2013.
Yapeng Wang et al. Bluetooth Indoor Positioning using RSSI and Least Square Estimation, 5 pages, 2010.
Günther, André, and Christian Hoene. "Measuring round trip times to determine the distance between WLAN nodes." Networking 2005. Berlin, 2005. p. 1-12.
How to measure distance between two iphone devices using bluetooth? Stack Overflow, retrieved Nov. 13, 2013, 3 pages.
Joonyoung Jung et al. Distance Estimation of Smart Device using Bluetooth. The Eighth International Conference on Systems and Networks Communications, 2013, p. 13-18.
Harold Naumann, M2M Machine to Machine, dated Aug. 28, 2012, 4 pages.
InSSIDer, Wikipedia, retrieved Nov. 13, 2013, 4 pages.
Kismet (software), Wikipedia, retrieved Nov. 13, 2013, 2 pages.
Daan Scheerens. Practical Indoor Localization using Bluetooth, Jan. 2012, 120 pages.
Liam Boogar, Why Polestar's indoor GPS Technology—10 years in the making—is the future of local commerce, dated Apr. 15, 2013, 3 pages.
Wireshark, Wikipedia retrieved Nov. 13, 2013, 4 pages.
Continuous Indoor Positioning: GNSS: Wi-Fi, and MEMS Dead Reckoning, dated Nov. 1, 2012, 20 pages.
Accurate Mobile Indoor Positioning Industry Alliance, called In-Location, to promote deployment of location-based Indoor services and solutions, dated Aug. 23, 2012, 9 pages.
The Ten Commandments of Wireless Communications, B&B Electronics 2009, 6 pages.
Publisher Solutions, Aisle411, 2013, 1 page.
Bluetooth, Wikipedia retrieved Nov. 13, 2013, 23 pages.
Andrei et al. Bluetooth Triangulation, retrieved 2014, 14 pages.
MacRumors Forum, retrieved Nov. 13, 2013, 3 pages.
Josef Hallberg et al. Abstract Positioning with Bluetooth. CiteSeerX, retrieved Nov. 13, 2013, 1 page.
iPhone 5s: About Touch ID security, retrieved Feb. 12, 2014, 3 pages.
iOS 7: Understanding Location Services, retrieved Feb. 12, 2014, 4 pages.
iOS: Understanding iBeacon, retrieved Feb. 12, 2014, 2 pages.
Location APIs. Android Developers, retrieved Feb. 12, 2014, 1 page.
WiFi Certified Passpoint. Wi-Fi Alliance, retrieved Feb. 12, 2014, 3 pages.
Joyce Wang. Sochi Olympics—A Test Bed for New Comcast Services. CableFax Portal, dated Feb. 3, 2014, 2 pages.
Mobile 4G, WiMAX Forum, retrieved Feb. 12, 2014, 2 pages.
Bluetooth Smart Technology: Powering the Internet of Things. Low Energy Bluetooth Technology Website, 2 pages, retrieved Feb. 24, 2014.
About Z-Wave Technology, 2 pages, retrieved Feb. 24, 2014.
Wi-Fi Direct Wikipedia, retrieved Feb. 25, 2014, 5 pages.
Bluetooth, Wikipedia retrieved Feb. 25, 2014, 23 pages.
"The heat is on: Honeywell is finally challenging the Nest thermostat," Nathan Ingraham, theverge.com, Jun. 10, 2014.

* cited by examiner

| 500 | | |
|---|---|---|
| Device (501) | Type (503) | Format (505) |
| Smartphone (507) | Ticker (509) | Text Crawl (511) |
| TV (513) | Secondary Programming (515) | Pop-up (517) |
| Smartphone (519) | Secondary Audio (521) | AAC (523) |

FIG. 5

CONTENT DELIVERY

FIELD

Some aspects of the disclosure present methods and systems for delivering personalized content based on one or more factors.

BACKGROUND

Content providers deliver content to end users based on a limited set of data. For instance, content may be delivered when an end user makes a selection or based on a "favorite" channel list for channels. A provider may also monitor user viewing habits (e.g., via the creation of a user profile, etc.) and recommend content based on information gathered from those habits.

However, searching for content of interest through content or programming guides and other types of user interfaces may be unfriendly, time-consuming, and inefficient. In addition, with the dramatic increase in various types of available content, providers may face increasing challenges to locating and delivering content of interest to users.

Therefore, improved and/or alternative methods/systems are needed to deliver personalized content.

BRIEF SUMMARY

The following presents a simplified summary in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

To overcome limitations in the prior art, and to overcome other limitations that will be apparent upon reading and understanding the present specification, the present disclosure is directed to a method and system for personalized delivery of content.

Aspects of the disclosure relate to a system/method in which a scene may be determined based on a collection of factors such as details about an individual or group to which content will be delivered. Once a relevant scene has been determined or defined, personalized content consistent with the scene may be delivered to end users.

Aspects of the disclosure may be implemented via a computer-readable medium having computer-executable instructions to perform one or more of the process steps described herein.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein:

FIG. 5 shows an example lookup chart in accordance with various aspects of the disclosure.

DETAILED DESCRIPTION

In the following description of the various embodiments, reference is made to the accompanying drawings, which form a part hereof, and in which is shown by way of illustration various embodiments in which aspects may be practiced. It is to be understood that other embodiments may be utilized and structural and functional modifications may be made without departing from the scope of the present disclosure.

As mentioned above, there are problems associated with delivering personalized content to end users. In this regard, content may include any type of information, including video, audio, data, e-books, financial data, etc., or a combination of more than one type. Additionally, content may be requested from any number of sources, including the Internet, video libraries, live programming, etc.

In certain aspects, the present disclosure recognizes that the circumstances surrounding a request for content can vary widely. For example, these factors may include collective past content preferences of users requesting content, time-based considerations (e.g., time of day, season of the year, etc.) in which the content is requested, and location-based influences (e.g., location of a user's home within a country/city, location of a user device within a user's home, weather at a location, etc.). Taken together, these circumstances/factors may define a scene that may be used to recommend customized and/or personalized content to one or more users. In other words, scenes may represent more meaningful descriptors of content and may simplify navigation of content.

The disclosure recognizes that identifying users requesting content and analyzing complex spatiotemporal patterns in their collective preferences for content may be useful in delivering better targeted and more personalized content. For instance, consider a scenario where various members of a family request content through a gateway located within their home and assume that the family has three members (e.g., two parents and a child). When all three members get together to watch a program, the gateway may consider all of the relevant environmental factors involved before delivering a programming option that falls within a scene or category that is consistent with all three family members being present (e.g., family entertainment programming options). However, when only one or two of the family members request content, an analysis of the environmental factors for this subgroup of the family may cause the gateway to deliver a programming option that falls within a separate scene (e.g., action movies preferred by the father/child, romantic comedies preferred by both parents, cartoons preferred by the child, etc.).

Figure 1:
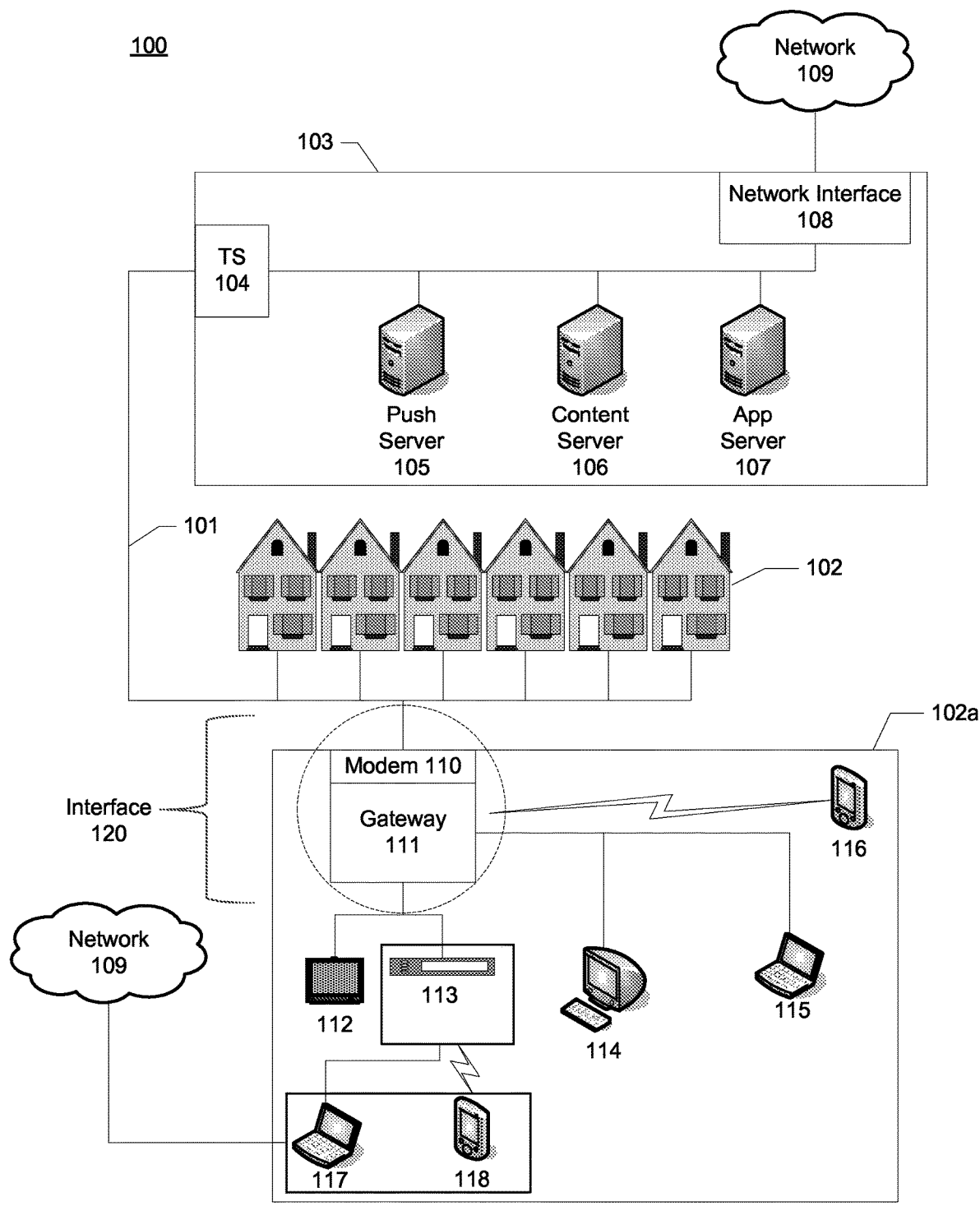
FIG. 1 illustrates an example information access or distribution network.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication lines 101 (e.g., coaxial cables, optical fibers, wireless, etc.) to connect multiple homes 102 to a central office (which can be a local headend) 103. The central office 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. Although the term home is used by way of example, locations 102 may be any type of user premises, such as businesses, institutions, etc. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a termination system (TS) 104, such as a cable modem termination system (CMTS), which may be a computing device configured to manage communications between devices on the network of lines 101 and backend devices such as servers 105-107 (to be discussed further below). The TS 104 may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The TS 104 may be configured to place data on one or more downstream channels or frequencies to be received by devices, such as modems at the various homes 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate content delivery devices through a registration process, validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, ASP, .NET, perl, python, ruby with JEE/J2EE, IIS, apache). For example, an application server may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And another application server may be responsible for receiving user remote control commands, and processing them to provide an intelligent remote control experience.

In accordance with at least one aspect of the disclosure, any of servers 105-107 (or other servers associated with central office 103) may be involved in receiving information from client devices (e.g., a modem within a home of a user), analyzing this information, and, based on this analysis, defining a new scene and/or retrieving a predefined scene from a memory associated with servers 105-107. Once a scene has been defined/retrieved, servers 105-107 may also recommend content consistent with the defined scene to end users.

An example home 102*a* may include a device 110, such as a modem, which may include transmitters and receivers used to communicate on the lines 101 and with the central office 103. The device 110 may be, for example, a coaxial cable modem (for coaxial cable lines 101), a fiber interface node (for fiber optic lines 101), or any other desired modem device. The device 110 may be connected to, or be a part of, a gateway interface device 111. In some aspects, device 110 and gateway 111 may together comprise an interface 120 for example home 102*a*. The gateway interface device 111 may be a computing device that communicates with the device 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional gateways 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth® interfaces, and others.

In addition, each of the devices 110-116 may communicate with one or more inherently personal (e.g., associated with a given user or group of users) devices 117-118 that may help to identify a given user and his/her content preferences. In addition, similar to devices 110-116, devices 117-118 may also function to deliver content to one or more end users. For instance, FIG. 1 shows a gateway 113 in communication with a laptop 117 and/or wireless device 118

(e.g., a smartphone, etc.). One of ordinary skill in the art would recognize that devices 117-118 are not limited to a laptop 117 and/or a wireless device 118 and may represent as wide a variety of devices as primary client devices 110-116. Laptop 117 and/or wireless device 118 may be associated with a given user within home 102a and may communicate with gateway 113, network 109, and/or ultimately with central office 103 through network 109 to help establish the identity of users operating each of devices 117-118. In this regard, devices 110-116 may each represent primary client devices that are potentially shared between multiple users (e.g., a family, etc.) within home 102a and used for content consumption. Meanwhile, devices 117-118 may represent secondary client devices that help to establish the identity of one or more users requesting personalized content through primary client devices 110-116. Secondary client devices 117-118 may also present content related to the content presented through primary client devices 110-116. Although FIG. 1 only shows gateway 113 in communication with two secondary client devices 117-118, one of ordinary skill in the art would understand that any of the primary client devices 110-116 may be in communication with any number of secondary client devices 117-118.

Figure 2:
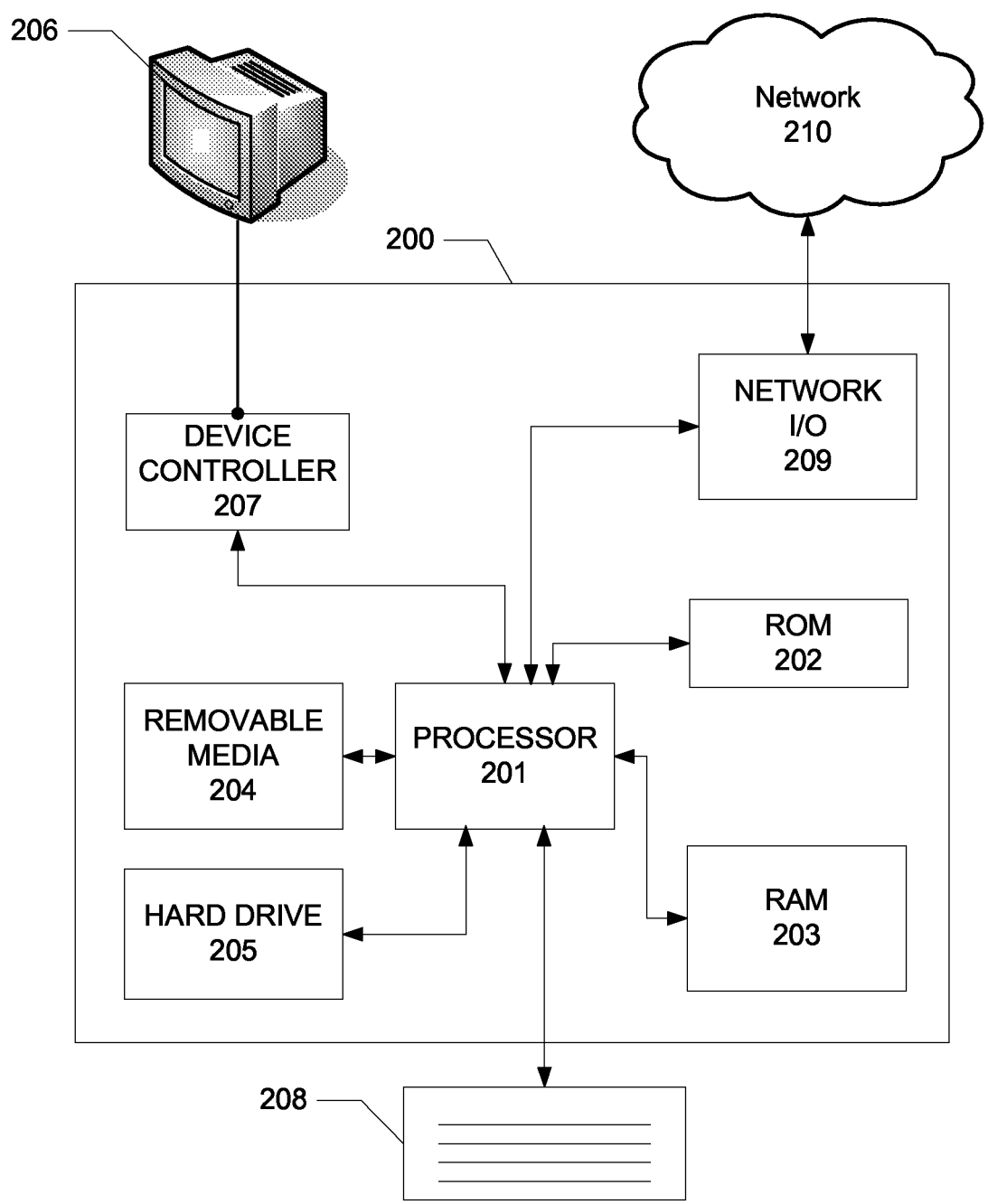
FIG. 2 illustrates an example hardware and software platform on which various elements described herein can be implemented.

FIG. 2 illustrates general elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces (e.g., a communication module), such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

The components illustrated in the figures herein are merely examples, and can be altered, combined, subdivided, in any desired manner to still achieve results described herein. Moreover, the devices shown in FIGS. 1 and 2 may be portable, stand-alone, or spread across multiple devices, etc.

In certain aspects of the disclosure, primary client devices 110-116, secondary client devices 117-118 and/or network servers 105-107 (or other servers associated with central office 103) may be involved in delivering personalized content to end users. Servers 105-107 and/or each primary/secondary client device 110-118 may store information for defining a scene and for aiding servers 105-107 and/or devices 110-116 in recommending content that may be of interest to one or more users. In this regard, a scene may be a collection of environmental factors such as attributes associated with users requesting content (e.g., content preferences, emotions of the users while consuming content, age, gender, etc.), the precise location of a primary client device 110-116 through which content is being requested within a general area (e.g., living room within a home), the time at which the content request is made, and other location/time-based considerations related to the content request. For example, if a user sends a message to a friend that he/she is very excited about a program that is currently being watched, primary client devices 110-116 and/or servers 105-107 may factor this emotion into recommendations of future content (e.g., by being more likely to recommend similar content). Similarly, if the user declares (e.g., via email, Twitter®, Facebook®, and/or through other applications stored on secondary/primary client devices 110-118, etc.) that a program currently being watched is not of interest, primary client devices 110-116 and/or servers 105-107 may factor this emotion into future recommendations by being less likely to recommend similar programs.

In this regard, servers 105-107 and/or primary client devices 110-116 may transmit content recommendations to an individual or group by defining a scene that includes one or more of the aforementioned factors and, once defined, either accessing previous content recommendations stored in a memory of devices 110-116 and/or servers 105-107 or generating new content recommendations associated with similar scenes for delivery to end users. If no similar scenes exist for comparison purposes, devices 110-116 and/or servers 105-107 may generate and store a new scene for later use. In other words, servers 105-107 and/or primary client devices 110-116 may define a scene and recommend personalized content based on data that is at the intersection of information related to the users making the content request, the particulars of devices 110-116 through which content is requested, and time/location-related details about the content request.

For example, servers 105-107 and primary client devices 110-116 may deliver targeted advertisements to users based on information stored within a relevant scene. In this aspect, a product/service offering may appear on a display screen associated with a primary client device 110-116 and/or a secondary client device 117-118 when the circumstances of a given content request match the attributes of a predefined scene and/or the attributes of a new scene. For example, if one or more users are identified as baseball fans by devices 110-118 and/or by servers 105-107 (e.g., either by a user providing this information explicitly or by devices 110-118 and/or servers 105-107 inferring this attribute from an analysis of previous content preferences, purchasing behavior, etc.), central office 103 may deliver advertisements for baseball tickets, paraphernalia, etc. In this aspect, when primary client devices 110-116 and/or servers 105-107 determine that a group of users are requesting content, primary client devices 110-116 and/or servers 105-107 may deliver content that appeals the interests of the group (e.g., group discounts for sporting events, etc.).

Figure 3:
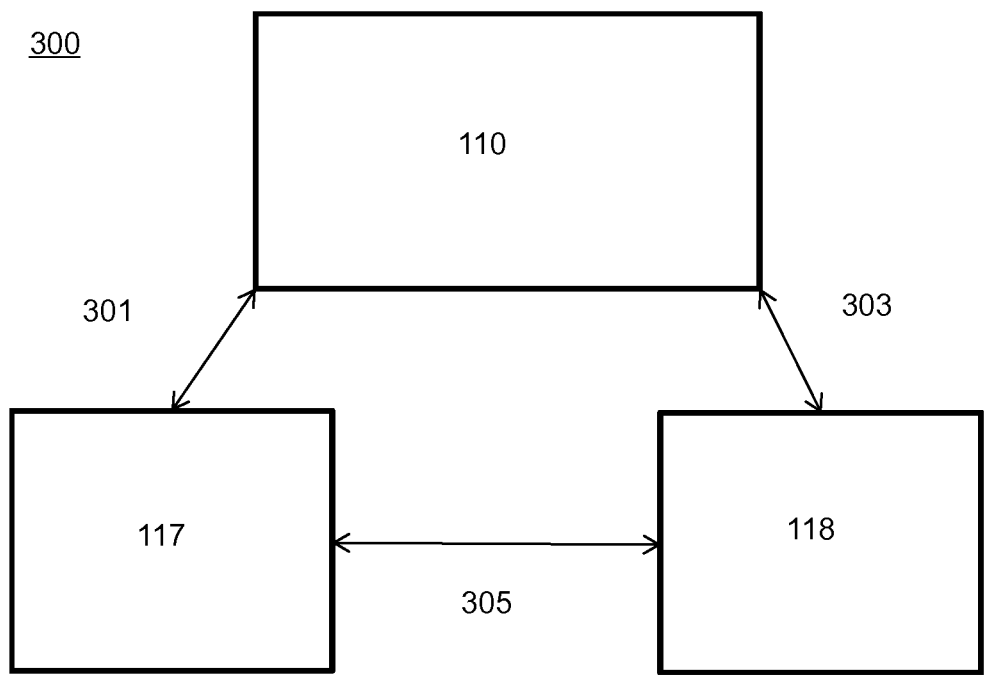
FIG. 3 illustrates a diagram of network pathways in accordance with various aspects of the disclosure.

FIG. 3 illustrates a diagram of network communication pathways in accordance with at least one aspect of the disclosure. Although FIG. 3 shows only one primary client device 110 (e.g., a modem), one of ordinary skill in the art would understand that any of primary client devices 110-116 may be included in diagram 300. Primary client device 110 may communicate with secondary client devices 117-118 via communication pathways 301 and 303, and secondary client devices 117-118 may communicate with each other through communication pathway 305. Devices 110, 117, and/or 118 may communicate over pathways 301-305 using any of various wired and/or wireless protocols, including Wi-Fi, Bluetooth®, etc.

For instance, to extend the above example of a family of three members, assume that each family member has a smartphone (e.g., secondary client devices 117-118) and that each individual carries his/her smartphone with them when moving from one location to another within their home. Assume also that the family has several display devices (e.g., televisions, smartphones, etc.) throughout the house, including one in the family room and another in the basement. If both parents and the child decide to watch a program together on a Friday evening within the family room, each family member's smartphone may communicate with the family room display device (e.g., a primary client device 110-116) and/or with servers 105-107 in central office 103 so that either the family room display device and/or central office 103 can determine that each of the three family members are located in front of the family room display device (e.g., ready to consume content). For instance, each smartphone and the family room display device may communicate its location (e.g., GPS coordinates) to central office 103 (so that each smartphone and the family room display device do not have to communicate directly with one another) and servers 105-107 within central office 103 (or other servers located within a cloud computing environment that are associated with central office 103) may analyze this information to determine that each family member is within a predetermined threshold distance of the family room display device and to conclude that all three family members are, therefore, collectively making a request for content (even though only one of the three family members may be operating a control device such as a remote control associated with the family room display device).

In one aspect, a secondary client device 117-118, such as a smartphone, may itself be used to control the family room display device (e.g., for changing/rewinding/pausing/fast-forwarding programming options, etc. on the family room display device via an application stored on the smartphone). The family room display device and/or central office 103 may use information related to these control functions to identify/locate the proximity of the smartphone (and, therefore, its user) being used for control of the family room display device. Additionally or alternatively, each smartphone may communicate its location to the family room display device and the family room display device may either process the information to determine the location of the three family members or transmit the location information as before to central office 103 for further processing.

In some aspects, a secondary client device 117-118 may have an application stored in a memory (e.g., ROM 202) that determines its specific location (and, therefore, the location of the user of the secondary client device 117-118) within a general area. This application may use various techniques to determine and/or infer the location of secondary client device 117-118 within a general area (e.g., such as by triangulation of signals from multiple Wi-Fi hotspots within a home, Bluetooth® signaling, near-field communication (NFC) chips, GPS-based signaling mechanisms, audio fingerprinting using inaudible frequencies, explicit associations such as a device "bump," Quick Response (QR) codes, radio frequency identification (RFID), a latency ping (e.g., involving Digital Transmission Content Protection (DTCP)), video/light flickering that cameras may detect, audio/video watermarking from one device picked up by another, etc.). In other embodiments, software for determining the location of secondary client devices 117-118 may be stored on primary client devices 110-116 (e.g., which may act as "master devices" that may be aware of various secondary client devices 117-118 that may be proximate to them, etc.) and/or within a server (e.g., server 105-107) associated with central office 103. In additional aspects, primary client devices 110-116 and/or a network server 105-107 may transmit a signal (e.g., audio, electrical, etc.) to ping secondary client devices 117-118 (or vice versa) for proximity detection. In yet additional embodiments, a user of a secondary client device 117-118 may input his/her specific location (e.g., an explicit declaration) within a general area so that secondary client device 117-118, primary client device 110-116, and/or a network server 105-107 can determine if the user is within a predetermined distance of the primary client device 110-116.

Going back to the above example of three family members requesting a programming option from their family room, the family room display device and/or servers 105-107 may access and analyze user profile information (e.g., including past content preferences, name, age, gender, address, etc. for each person) related to each of the three family members once the family room display device and/or servers 105-107 have determined the identities of the individuals making a content request. The family room display device and/or servers 105-107 may also analyze one or more other environmental factors to determine the scene for the content request. For instance, the family room display device and/or servers 105-107 may consider that the display device through which content is being requested is located in the family room of the family's home, and that location may be an important factor in presenting one programming option over another (if, for example, the family room display device is typically used for family entertainment programming options, 3D content, etc. versus other types of content). In additional aspects, the family room display device and/or servers 105-107 may consider factors such as the time at which the content request is made (e.g., AM versus PM, etc.), the date of the request (e.g., season of the year), and the city/state/country from which the request is made.

In some aspects, servers 105-107 and/or primary client devices 110-116 may determine profile characteristics (e.g., past content preferences, name, age, gender, address, etc.) of one or more users by interfacing with third party information repositories such as social networking websites, public records, etc.

Figure 4:
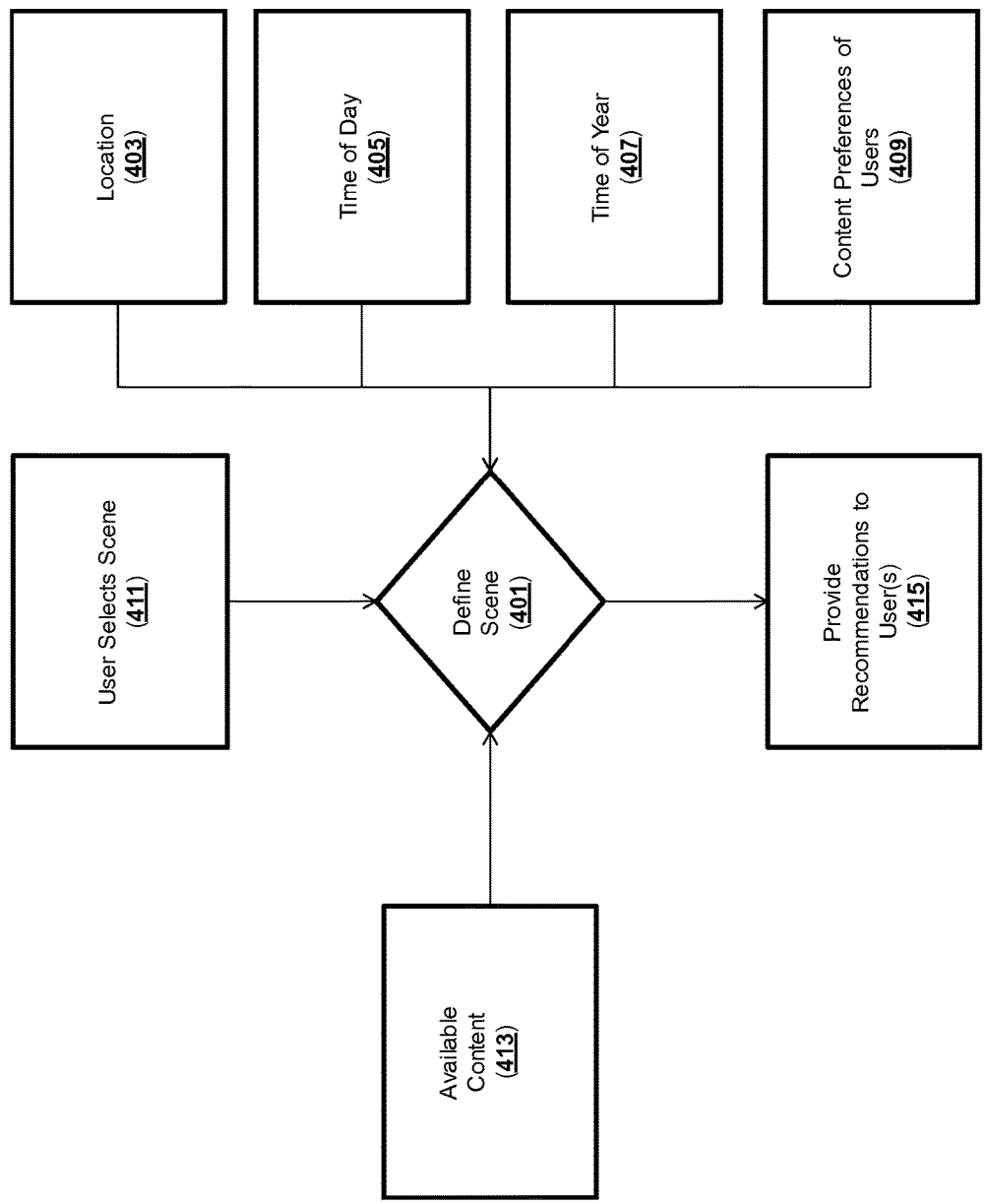
FIG. 4 illustrates a flowchart of various factors that devices may consider in recommending content, in accordance with various aspects of the disclosure.

FIG. 4 illustrates a flowchart of various factors that may be considered in recommending content, in accordance with at least one aspect of the disclosure. To define a scene at step 401 in FIG. 4, primary client devices 110-116 and/or servers 105-107 associated with a content provider may consider various factors, e.g., factors 403-413. Factors 403-413 may include the location 403 of primary and/or secondary client devices 110-118 related to a content request, time of day 405 at which the content request is made (e.g., AM versus PM), time of year 407 at which the content request is made, content preferences 409 (e.g., past preferences) of users (e.g., users of secondary client devices 117-118 within a predetermined distance of a given primary client device 110-116), scene selections 411 made by one or more of the users involved (e.g., a sports scene for watching Sunday afternoon football games, an exercise scene for viewing content such as music videos, workout videos, and/or energetic programming on a display device located in a home exercise environment, etc.), and content that is available 413 from the central office 103. One of ordinary skill in the art would recognize that secondary client devices 117-118, primary client devices 110-116, and/or servers 105-107 may use additional or alternative factors inferred by attributes of a partially defined scene and/or provided directly by one or more users to further customize the scene. After defining a scene at step 401 using one or more of the factors 403-413, the process shown in FIG. 4 may move to step 415 where primary client devices 110-116 and/or servers 105-107 associated with a content provider may provide content recommendations based on the scene defined in step 401.

In some aspects, users consuming content on a primary client device 110-116 may use secondary client devices 117-118 and/or other primary client devices 110-116 to receive additional (e.g., secondary, supplemental, etc.) content related to the content currently being delivered on the primary client device 110-116. Also, the types of content (e.g., ticker, secondary/supplemental programming, secondary/supplemental audio, etc.) that are delivered and the format (e.g., text crawl, pop-up, advanced audio coding (AAC), etc.) in which the content is delivered may be preset for specific devices 110-118. In this regard, devices 110-118 and/or central office 103 may establish/store standard constructs in the form of a lookup chart that details the type and format of the content associated with each device 110-118. Servers 105-107 associated with central office 103 may search for a primary/secondary client device 110-118 and return the associated type and format of the content based on the information in the lookup chart. In other examples, a given primary client device 110-116 may store the lookup chart in an associated memory and deliver the appropriate content type and format to each secondary client device 117-118 in communication with the given primary client device 110-116.

FIG. 5 shows an example lookup chart 500 with information related to the type 503 and format 505 of content delivered to a given primary and/or secondary client device 501, in accordance with at least one aspect of the disclosure. Chart 500 includes a first smartphone 507 associated with ticker-based content 509 delivered as a text crawl 511, a television 513 associated with secondary programming content 515 delivered in pop-up format 517, and a second smartphone 519 associated with secondary audio content 521 delivered in AAC format 523. In this regard, secondary programming content 515 and secondary audio content 521 may represent a copy of programming content delivered on another device 110-118 and/or content that is supplemental to content delivered on another device 110-118. One of ordinary skill in the art would understand that chart 500 may include additional/alternative devices 501 associated with additional/alternative content types 503 and formats 505.

As an example, consider a scenario where a husband and wife are watching the Daytona 500 car race on their living room display device. Suppose that the husband's favorite driver is Jeff Gordon and the wife's favorite driver is Dale Earnhardt, Jr. In this example, the couple may receive additional but related content on their secondary client devices 117-118 (e.g., smartphones, laptops, etc.) and/or on other primary client devices 110-116 (e.g., other display devices within their home, etc.). This additional content may include secondary programming such as an in-car camera for Jeff Gordon delivered to the husband's smartphone and an in-car camera for Dale Earnhardt, Jr. delivered to the wife's smartphone. In addition, these in-car camera views may be delivered in pop-up format to the living room display device or another display device in their home. Additionally or alternatively, the racing statistics for Jeff Gordon's car may be presented as ticker content (e.g., as a text crawl) running across the bottom of the husband's smartphone whereas the statistics for Dale Earnhardt Jr.'s car may be presented as ticker content running across the bottom of the wife's smartphone. In yet other examples, a secondary audio (e.g., different language, commentator, etc.) of the race may be presented to one or more of their smartphones.

In other examples, personalized ticker content for both Jeff Gordon and Dale Earnhardt, Jr. may be displayed on the living room display device. If a child joins the couple and is detected, ticker content related to the child's favorite driver may also be displayed on the living room display device. In other words, the personalized experience may not necessarily be limited to personalized devices (e.g., mobile phone, etc.); rather, the personalized experience may be leveraged on a primary client device (e.g., a main display device used by many users).

In one aspect, once primary/secondary client devices 110-118 and/or central office 103 have defined a scene, devices 110-118 and/or central office 103 may also create a uniform resource identifier (URI) for the scene. In this regard, a URI may represent an identifier (e.g., alphanumeric string, etc.) associated with a specific content type and/or format on a specific device 110-118 (television, laptop, tablet, gateway, smartphone, etc.). For example, using the example above of the Daytona 500, one URI may be associated with a live feed of the race, a second URI may be associated with the in-car camera feed for Jeff Gordon, a third URI may be associated with the in-car camera feed for Dale Earnhardt, Jr., and a fourth URI may be associated with a text crawl of Jeff Gordon's car racing statistics. One of ordinary skill in the art would understand that any number of URIs may be created for each piece of content. Once a network map with all relevant primary client devices 110-116 and/or secondary client devices 117-118 has been created (e.g., once a relationship has been established between devices 110-118), a given primary/secondary client device 110-118 may request content associated with one or more predetermined URIs. A given primary client device 110-116 and/or servers 105-107 associated with central office 103 may then push content represented by the requested URIs to the appropriate devices 110-118.

One of ordinary skill in the art would understand that primary and secondary client devices 110-118 may not necessarily be located within a home, office, etc. For example, a primary client device 110-116 may be located within a store window and may recognize the identity (e.g., age, gender, content preferences, etc.) of window shoppers carrying secondary client devices 117-118 (e.g., smartphones) within a predetermined distance of the store window. Once the identity of the window shoppers is confirmed, primary client device 110-116 may deliver personalized content (e.g., pop-up advertisements on a display screen associated with primary/secondary client devices 110-118, etc.) to the window shoppers. Here again, the primary client device 110-116 within the store window may take into account a combination of factors such as its location and the time of day at which content is being delivered in addition to the cumulative profile characteristics of appropriate groups of window shoppers (e.g., friends shopping together, etc.) in accessing/generating the appropriate scene for delivering personalized content.

In certain aspects, primary client devices 110-116 and/or servers 105-107 may define a scene and/or recommend content to users located at the same and/or at different locations. For instance, if two friends routinely but individually watch the same program in their respective homes, primary client devices 110-116 and/or servers 105-107 associated with central office 103 may access/analyze this information the next time either friend requests similar content. To extend this example, consider a scenario where both friends routinely watch baseball games featuring their hometown baseball team in their respective homes. The next time the two friends get together and request content (or if one of the friends is requesting content alone), a primary client device 110-116 through which content is requested and/or servers 105-107 associated with central office 103 may analyze the content preferences of both friends, may recognize that both friends are avid fans of the hometown baseball team, may define a scene consistent with these preferences even though both friends may not have cultivated these preferences while they were at the same location, and may recommend content that may appeal to a group of baseball fans (e.g., a baseball game featuring the hometown baseball team, discounts for group tickets to the next hometown baseball game, etc.).

In addition, consider a similar scenario where both friends routinely watch baseball games featuring their hometown baseball team together. In this scenario, a primary client device 110-116 that they use to watch baseball games and/or servers 105-107 may define a scene that captures attributes of this experience (e.g., a "baseball game" scene for the two friends that identifies factors such as the time at which they usually watch the games, the location in which the games are watched, etc.). Once a scene has been established, the next time either one of the friends requests content, a primary client device 110-116 and/or servers 105-107 may recommend similar content (e.g., baseball game content, advertisements, product offerings, etc.), even though both friends may not be co-located. In this scenario, the primary client device 110-116 through which one of the friends is watching baseball-related content and/or servers 105-107 providing the baseball-related content may cause a pop-up window to appear on a display associated with the primary client device 110-116. The pop-up window may ask the individual watching baseball-related content if he/she would like the primary client device 110-116 and/or central office 103 to contact his/her friend (e.g., via an inter-home message) to inquire about his/her availability/desire for watching the same or similar content. If the individual watching baseball-related content chooses to ask his/her friend about his/her desire/availability for watching similar content, a message with the inquiry may be transmitted either from one individual's primary client device 110-116 to his/her friend's primary client device 110-116, from one individual's secondary client device 117-118 to his/her friend's primary client device 110-116, and/or from one individual's secondary client device 117-118 to his/her friend's secondary client device 117-118. In this way, proximity of various users may not be limited to the same general area (e.g., a single home) but rather by a predefined set of rules (e.g., rules related to whether or not an individual is within a friends network).

Secondary client devices 117-118 may require users to opt-in and/or accept (e.g., via a one-time terms-of-service acceptance for each content provider or an acceptance each time information transfer is about to take place) to information being transmitted to primary client devices 110-116 and/or central office 103 before the information is actually transmitted to these devices. Also, in some aspects, users of secondary client devices 117-118 may remain anonymous during the process of determining profile characteristics (e.g., past content preferences, etc.) for delivering personalized content. In this aspect, central office 103 and/or primary client devices 110-116 may maintain the anonymity of users of secondary client devices 117-118 by determining/ using anonymous identifiers (e.g., media access control (MAC) addresses, serial numbers, product codes, etc.) associated with the secondary client devices 117-118 and accessing/analyzing anonymous profile information associated with these identifiers to define a scene and/or to deliver specific content that is consistent with the defined scene.

For instance, suppose that two friends regularly get together at one of their homes to watch football games on Sunday afternoons in the fall season. When the two friends get together for a new football game on a given Sunday, servers 105-107 associated with central office 103 and/or a primary client device 110-116 through which the two friends watch the football games may recognize the serial numbers of phones carried by both individuals, may determine that the two individuals are requesting content, may access previous viewing preferences (e.g., a past history of viewing football games) for the two individuals associated with the identified serial numbers, may consider spatiotemporal factors such as the location of the primary client device 110-116 (e.g., a past history of viewing football games through a primary client device located in a specific room of a home) and/or the time of year (e.g., a past history of viewing football games in the fall season) in which the request is made, may access a previously determined scene that fits all of these attributes, and may deliver content to the primary client device 110-116 based on the identified scene. In this aspect, primary client device 110-116 and/or central office 103 may deliver content to end users based on identifying the characteristics of a scene associated with a content request and based on information gleaned from previous scenes similar to the identified scene in question.

In some aspects, the method and system discussed herein may operate in two different modes. In a first mode of operation, servers 105-107 associated with central office 103, a primary client device 110-116, and/or a secondary client device 117-118 may detect all (other) secondary client devices 117-118 within a predetermined distance of the primary client device 110-116 when a user selects an option (e.g., on a remote control and/or display associated with devices 110-118, etc.) to initiate device detection. In a second mode operation, servers associated with central office 103, a primary client device 110-116, and/or a secondary client device 117-118 may automatically and/or continuously detect all (other) secondary client devices 117-118 within a predetermined distance of the primary client device 110-116. In either case, servers associated with central office 103, a given primary client device 110-116, and/or a given secondary client device 117-118 may create and update a network map of all devices 110-118 that are within a predetermined proximity of the given primary client device 110-116.

In addition, although servers associated with central office 103, a given primary client device 110-116, and/or a given secondary client device 117-118 may periodically update the network map, changes in the network map may but do not necessarily have to result in changes to content delivered to users. For instance, if two individuals are watching a program on a display device and one of the individuals leaves the scene, the display device may or may not change the program due to the absence of one of the individuals.

In one aspect, when changes in the network map cause changes in the content that is delivered to users, this feature may act as a type of parental control. For instance, if two parents are watching age-restricted material on a display device within a family room in their home and servers 105-107 associated with central office 103, the display device, and/or a given secondary client device 117-118 detects that one of their children is within a predetermined distance of the display device, the display device may automatically switch away from the age-restricted content (e.g., by switching to another program, blanking the screen, etc.).

Figure 6:
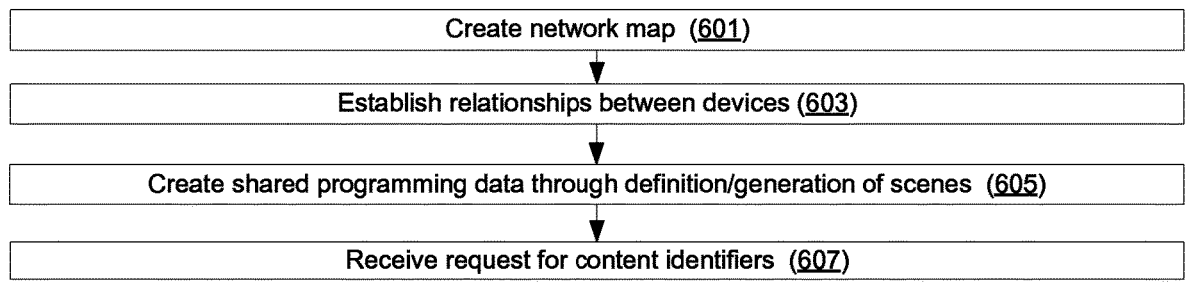
FIG. 6 shows a flow chart of various steps involved in recommendation of content, in accordance with various aspects of the disclosure.

FIG. 6 shows a flow chart of various steps involved in the recommendation of content, in accordance with at least one aspect of the disclosure. The process shown in FIG. 6 starts at step 601 where a given primary client device 110-116 and/or servers (e.g., servers 105-107) associated with central office 103 may create a network map of devices 110-118 through communication schemes such as Wi-Fi, Bluetooth®, and/or GPS signaling. When a network map is created, each device 110-118 in the network map is assigned an identity so that a given primary client device 110-116 and/or central office 103 may determine various pieces of information associated with the identity. This information includes the identity of users using a given device 110-118, where users are located, where the device 110-118 is located, and content preferences associated with the users.

The process may then move to step 603 where relationships between devices 110-118 may be established based on the network map created in step 601. These relationships may be established either through a manual or automatic process. In the manual process, devices 110-118 may detect other devices 110-118 after a user selects an option on one of devices 110-118 for device detection to begin. In the automatic process, devices 110-118 may be detected without manual intervention. Relationships may be established between devices 110-118 within the same area (e.g., home, office, etc.) and/or between devices 110-118 that are related via a set of predefined rules (e.g., rules related to which devices are within a friends network, colleagues network, etc.) stored in a memory of one of the devices 110-118 (or stored in central office 103).

Once a network map has been created in step 601 and relationships have been established in step 603, the process may move to step 605 where primary client devices 110-116 and/or servers 105-107 may define/retrieve scenes and recommend shared programming data (e.g., personalized content, associated information, etc.) based on the information gathered in steps 601 and 603. For instance, if a user requests content from a room in her house that is generally used for exercise, primary client devices 110-116 and/or servers 105-107 may define a scene related to exercise programming after detecting various environmental factors, including the identity of the user (via her personal smartphone, etc.), her previous content preferences, the location of a display device (e.g., a primary client device 110-116 in the exercise room), and the time of day at which the content request is made (e.g., morning exercise time). Additionally or alternatively, the user may select the appropriate scene on the display device. Once a scene has been defined, primary client devices 110-116 and/or servers 105-107 may recommend content consistent with the defined scene (e.g., a workout video).

The process may then move to step 607 where devices 110-118 may request content identifiers (e.g., URIs) associated a content selection. Each URI may be a unique identifier that describes the type and format of content being delivered to a particular type of device 110-118.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, by a computing device, a content recommendation request associated with a plurality of users associated with a primary device;
   determining, by the computing device and via wireless communication with a plurality of wireless devices associated with the plurality of users, a plurality of user attributes respectively corresponding to the plurality of users;
   determining content recommendations based on:
      the plurality of user attributes; and
      a time of day associated with reception of the content recommendation request;
   causing output, via the primary device, of the content recommendations; and
   causing simultaneous output, via the primary device and after receiving a selection of a content item from the content recommendations, of:
      the selected content item;
      a first secondary content item based on a first user attribute, of the plurality of user attributes, associated with a first user of the plurality of users; and
      a second secondary content item based on a second user attribute, of the plurality of user attributes, associated with a second user of the plurality of users, wherein the first secondary content item is different from the second secondary content item and the first user attribute is different from the second user attribute.

2. The method of claim 1, further comprising:
   communicating with the plurality of wireless devices via a Wi-Fi protocol, a Bluetooth protocol, or both.

3. The method of claim 1, further comprising:
   accessing, using an identifier of the primary device, a lookup table to determine a delivery format in which the first secondary content item and the second secondary content item are to be output via the primary device.

4. The method of claim 1, further comprising determining, based on types of secondary content associated with each of the plurality of wireless devices, additional secondary content items, wherein the types of secondary content comprise a ticker, supplemental content, a secondary audio content, or a combination thereof.

5. The method of claim 1, wherein determining the content recommendations further comprises:
   determining the content recommendations further based on a type of content previously requested at a location of the primary device within a premises.

6. The method of claim 1, wherein the plurality of user attributes comprise demographic information and content preferences of the plurality of users.

7. The method of claim 1, wherein the first user attribute comprises information based on purchasing behavior of a user of the plurality users.

8. The method of claim 1, wherein the first user attribute comprises information based on an electronic communication history of a user of the plurality of users.

9. The method of claim 1, wherein the first user attribute comprises information based on a social networking site and corresponding to a user of the plurality of users.

10. The method of claim 1, wherein the first user attribute comprises information based on public records and corresponding to a user of the plurality of users.

11. The method of claim 1, further comprising:
generating, after the receiving the selection of the content item, a plurality of uniform resource identifiers (URIs) corresponding to a plurality of secondary content items associated with the selected content item;
receiving, from one or more of the plurality of wireless devices, requests for the plurality of URIs; and
wirelessly sending different URIs, of the plurality of URIs, to different wireless devices of the plurality of wireless devices.

12. A method comprising:
determining, by a computing device, times that a plurality of users consumed, at a common location, a type of content;
receiving, by the computing device and via a primary device within a first premises a content request associated with a first user of the plurality of users;
receiving, by the computing device, an identifier identifying a first wireless device in proximity to the primary device and associated with the first user;
retrieving, by the computing device and based on the identifier, first user attributes corresponding to the first wireless device;
determining, based on the first user attributes and a time of day associated with reception of the content request, content recommendations for content associated with the type of content;
sending, by the computing device and to the primary device, the content recommendations; and
after receiving a selection of a content item from the content recommendations:
  determining a second user of the plurality of users; and
  sending, by the computing device, to a second wireless device associated with the second user and located in a different premises than the first wireless device, and based on the determining the times that the plurality of users consumed the type of content at the common location, a request for the second user to view the selected content item.

13. The method of claim 12, further comprising:
sending, by the computing device and to the primary device, primary content corresponding to the selected content item; and
sending, to the second wireless device and based on receiving an indication that the second user has accepted the request to view the selected content item, the primary content.

14. The method of claim 12, further comprising:
generating a plurality of uniform resource identifiers (URIs) corresponding to a plurality of secondary content items associated with the selected content item; and
sending a first URI, of the plurality of URIs, to the first wireless device and a second URI, of the plurality of URIs, to the second wireless device.

15. The method of claim 12, wherein the first user attributes comprise demographic information and content preferences of the first user.

16. The method of claim 12, wherein the content recommendations are further determined based on weather at a location of the primary device.

17. The method of claim 12, wherein the content recommendations are further determined based on a geographical location of the primary device.

18. A method comprising:
receiving, by a computing device, a request for content for output via a primary device;
determining, by the computing device, based on the request, and via wireless communication with a plurality of wireless devices associated with a plurality of users, an association of the request with the plurality of users;
determining, based on the request and the association of the request with the plurality of users,
a time associated with the request;
determining, based on the determined time and content previously output, via the primary device, to the plurality of users at related times, content for output via the primary device; and
sending, to the primary device, the determined content.

19. The method of claim 18, further comprising:
communicating with the plurality of wireless devices via a Wi-Fi protocol, a Bluetooth protocol, or both.

20. The method of claim 18, further comprising determining, based on types of secondary content associated with each of the plurality of wireless devices, secondary content items, wherein the types of secondary content comprise a ticker, supplemental content, a secondary audio content, or a combination thereof.

21. The method of claim 18, further comprising:
generating, after the determining the content, a plurality of uniform resource identifiers (URIs) corresponding to a plurality of secondary content items associated with the determined content; and
sending different URIs, of the plurality of URIs, to different wireless devices of the plurality of wireless devices.

* * * * *

UNITED STATES PATENT AND TRADEMARK OFFICE
CERTIFICATE OF CORRECTION

PATENT NO. : 11,070,860 B2
APPLICATION NO. : 13/767513
DATED : July 20, 2021
INVENTOR(S) : Francisco et al.

It is certified that error appears in the above-identified patent and that said Letters Patent is hereby corrected as shown below:

In the Specification

Column 4, Detailed Description, Line 9:
Delete "HTMLS," and insert --HTML5,-- therefor In the Claims Column 15, Claim 12, Line 16:
After "premises", insert --,--

Signed and Sealed this
Fourth Day of April, 2023

Katherine Kelly Vidal
*Director of the United States Patent and Trademark Office*